United States Patent [19]

Ludwig et al.

[11] Patent Number: 5,208,112
[45] Date of Patent: May 4, 1993

[54] THERMALLY REGENERATED FUEL CELL

[75] Inventors: Frank A. Ludwig, Rancho Palos Verdes, Calif.; Robert A. Osteryoung, Snyder, N.Y.; Carl W. Townsend, Los Angeles; Andrew Kindler, San Marino, both of Calif.

[73] Assignee: Hughes Aircraft Company, Los Angeles, Calif.

[21] Appl. No.: 789,493

[22] Filed: Nov. 8, 1991

[51] Int. Cl.$^5$ ............................................. H01M 8/06
[52] U.S. Cl. ................................. 429/20; 429/46
[58] Field of Search ............................ 429/20, 46

[56] References Cited

U.S. PATENT DOCUMENTS 4,090,012 5/1978 Elliott et al. .
4,463,071 7/1984 Gifford et al. ..................... 429/194
4,604,330 8/1986 Walsh ................................... 429/13
4,738,924 4/1988 Ludwig et al. .
4,810,596 3/1989 Ludwig .

Primary Examiner—Olik Chaudhuri
Assistant Examiner—M. Nuzzolillo
Attorney, Agent, or Firm—M. E. Lachman; M. W. Sales; W. K. Denson-Low

[57] ABSTRACT

A thermally regenerated fuel cell for converting thermal energy into electrical energy. A hydrogen reactive cathode reacts with a solvent-free catholyte and a hydrogen reactive anode reacts with a solvent-free anolyte. Reactants consumed at the electrodes during the electrochemical reaction are regenerated thermally below about 250° C. to replenish the reactants consumed during the generation of electrical energy.

23 Claims, 1 Drawing Sheet ature of 450 degrees C. Consequently, this system is unsuitable for relatively low temperature conversion in thermally regenerated fuel cells.
THERMALLY REGENERATED FUEL CELL This invention was made with United States Government support under contract Number N00014-89-C-0071 awarded by the Department of the Navy. The United States Government has certain rights in this invention.

BACKGROUND OF THE INVENTION

1. Field of the Invention

The present invention relates generally to fuel cells used for converting thermal energy into electrical energy. More particularly, the present invention relates to thermally regenerated fuel cells which are based upon the oxidation and reduction of hydrogen and utilize solvent-free electrolytes.

2. Description of Related Art

Thermally regenerated electrochemical systems have been investigated extensively since the late 1950's. In these systems, the working substances utilized in an electrochemical cell to generate electrical current are regenerated by providing thermal energy to the products of the electrochemical reactions. These systems are similar to secondary batteries in many respects except that regeneration of the electrochemically active reactants is accomplished thermally rather than electrically.

Thermally regenerated fuel cell systems which are based upon the oxidation and reduction of hydrogen are particularly useful because hydrogen electrodes are very efficient. Such electrodes are capable of supporting reasonably high current flow and they are well known in the industry. Representative fuel cells which utilize hydrogen electrodes are described in U.S. Pat. No. 4,810,596 issued to Ludwig in March, 1989 and assigned to the present assignee, ('596 Patent). Among the systems which are described in the '596 Patent is a prior fuel cell in which the cathode electrolyte is concentrated sulfuric acid and the anode electrolyte is diluted sulfuric acid. The difference in acid concentration between the two solutions is maintained by heating the concentrated solution to distill water generated at the cathode. A significant disadvantage to this fuel cell system is the inefficient distillation process, the bulky equipment required for the distillation, and the need to circulate large amounts of water. Additionally, aqueous based systems require an external hydrogen return from cathode to anode which is prone to leaks. A preferred method for transferring the hydrogen from the cathode to the anode is through a porous cell separator. However, the low surface tension in aqueous systems allows electrolyte to flood the pores of these porous separators.

Another system described in the '596 Patent is an improvement to the above-described fuel cell in which a buffered solution containing sodium sulfate and sodium bisulfate is substituted for the dilute acid. During operation, sodium bisulfate is generated at the anode and sodium sulfate is consumed. For regeneration, the sodium bisulfate is thermally converted to sodium sulfate, water, and sulfur trioxide. The sulfur trioxide is combined with water to regenerate sulfuric acid. This system is well suited for its intended purpose, however, the regeneration procedure requires the conversion of sodium bisulfate to sodium sulfate and sulfuric acid at a temperature of 450 degrees C. Consequently, this system is unsuitable for relatively low temperature conversion in thermally regenerated fuel cells.

A fuel cell which is thermally regenerated at a lower temperature is disclosed in U.S. Pat. No. 4,738,904 issued to Ludwig et al. in April 1988, assigned to the present assignee ('904 patent). It utilizes a fluid Bronsted acid and a fluid Bronsted base in the cathode and anode, respectively. The anion of the acid combines with the cation of the base to form a salt which is thermally regenerated at temperatures below 250° C. This system, however, suffers from high electrolyte resistance and for most applications, water as an inert solvent is required.

Although the above-described fuel cells are well suited for their intended uses, there is a continuing need to provide thermally regenerated fuel cells which are not based upon aqueous electrolytes.

There is also a continuing need to provide thermally regenerated fuel cells which do not require the transfer of inert or aqueous solvents by energy consuming fractional distillation techniques. There is additionally a continuing need for high efficiency fuel cells which are capable of thermally regenerating the working electrolytes at relatively low temperatures of less than 200° C. For example, a need exists in the automotive industry for a system which can produce electrical energy from the waste heat of an internal combustion engine.

There is also a need to provide a thermally regenerated fuel cell with low internal resistance and high electrolyte conductivity.

SUMMARY OF THE INVENTION

The present invention provides a fuel cell and a method for generating electric power in which reactants in an electrochemical cell are simply and efficiently regenerated below about 250° C. The fuel cells of the present invention are based upon one or more highly conductive molten electrolytes which obviate any requirement for inert electrolyte solvents and fractional distillation procedures.

The thermally regenerated fuel cell of the present invention includes an electrochemical cell having a cathode compartment and an anode compartment. The two compartments have a common ion conducting separator. A hydrogen-reactive cathode and a hydrogen-reactive anode are located within their respective compartments with the cathode and anode being connectable externally from the system for generation of an electrical voltage and current between the electrodes.

A solvent-free catholyte comprising a proton donating gaseous acid or molten acid is located in the cathode compartment and in contact with the cathode. A solvent-free anolyte comprising a molten conductive base is located in the anode compartment and in contact with the anode. During operation of the thermally regenerated fuel cell, hydrogen gas is generated at the cathode and the acid is consumed. Also during operation of the fuel cell, the base combines with the anion of acid, and the base and hydrogen are consumed at the anode.

Means are provided for transferring any hydrogen gas generated at the cathode to the anode compartment for consumption at the anode during generation of the electrical current. In addition during operation of the fuel cell, the anion of the acid or the cation of the base migrate through the ion conducting separator to the anode or cathode compartment, respectively, and combine to form the corresponding product, which must be capable of being thermally decomposed at a temperature below about 190° C. to directly form the anolyte and catholyte. The anolyte and catholyte are additionally capable of being separated to regenerate the reactive components of the electrochemical cell.

A thermal regenerator is provided for thermally converting the reaction product directly to the catholyte and anolyte at a temperature below about 200° C. Means for transferring the salt from the anode and/or the cathode compartment to the thermal regenerator are also provided. An anode recycle system is provided for transferring the base formed in the thermal regenerator back to the anode compartment to replenish the base consumed during operation of the fuel cell. A cathode recycle system is also provided for transferring the acid formed in the thermal regenerator back to the cathode compartment to replenish the acid consumed during operation of the fuel cell.

DESCRIPTION OF THE PREFERRED EMBODIMENTS

Figure 1:
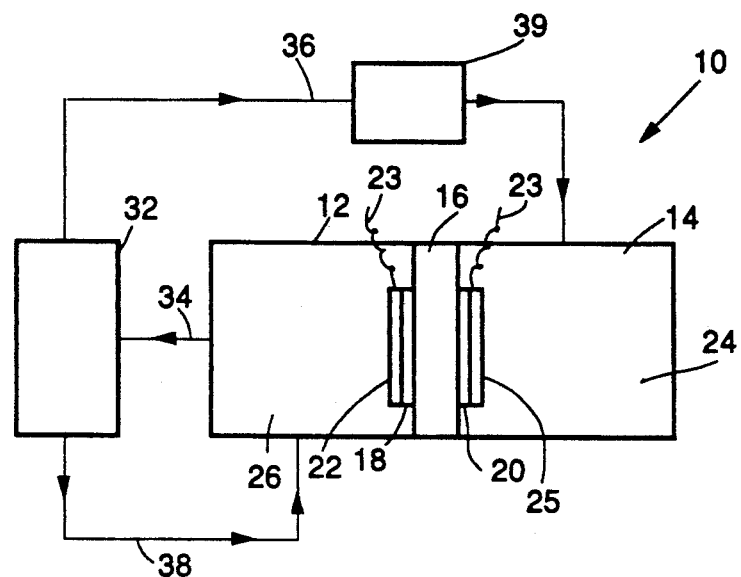
FIG. 1 is a schematic drawing of an exemplary electrochemical fuel cell of the present invention utilizing a common anion conducting separator.

An exemplary fuel cell of the present invention is illustrated in FIG. 1. The basic system is an electrochemical cell 10 having an anode compartment 12 and a cathode compartment 14. The anode compartment 12 and the cathode compartment 14 are separated by a common ion separator 16. A porous hydrogen-reactive anode 18 is located in the anode compartment 12 and a porous hydrogen-reactive cathode 20 is located in the cathode compartment 14. Current collectors 25 and 22 are each in contact, respectively, with the hydrogen-reactive cathode 20 and the hydrogen-reactive anode 18. Current collectors 22 and 25 are further each connectable to an external circuit 23 for carrying the generated electrical current. A solvent-free catholyte 24 generally comprising a molten or gaseous proton donating acid is located in the cathode compartment 14 and in contact with the cathode 20. Similarly, a solvent-free anolyte 26 generally comprising a molten conductive base or gaseous base, is located in the anode compartment 12 and in contact with the anode 18. At least one of the solvent-free anolyte and solvent-free catholyte is a molten conductive salt.

Included in the thermally regenerated fuel cell of the present invention illustrated in FIG. 1 is a thermal regenerator 32 for thermally converting the products of the electrochemical reaction directly to the catholyte 24 and anolyte 26 at a temperature below about 250° C. Line 34 provides a means for removing the electrochemical reaction products from the anode compartment 12 to the thermal regenerator 32 and line 36 provides a recycling means for transferring the catholyte 24 formed in the thermal regenerator 32 to the cathode compartment 14. Line 38 additionally provides a recycling means for transferring the anolyte 26 formed in the thermal regenerator 32 back to the anode compartment 12.

The common ion separator 16 utilized in the fuel cells of the present invention can be a porous or a non-porous material depending upon the particular electrochemical cell configuration. A porous common ion separator 16 allows the free movement of hydrogen gas, which is formed at the cathode 20, across the separator. Thus, the presence of a porous common ion separator 16 obviates the need for externally supplying the hydrogen gas to the anode 18. Once it is formed at the cathode 20, the gas can migrate across the porous common ion separator 16 to the anode 18 where it is oxidized to hydrogen ion.

The common ion separator 16 can additionally be either an anion conducting membrane or a cation conducting membrane. As will be discussed below, each has its attendant advantages. Conventional porous or microporous membranes utilized in electrochemical cells are appropriate for use in the fuel cell of the present invention. Nafion ® available from DuPont, is a preferred exemplary cation separator. It is permeable to cations while restricting the movement of anions between the cathode compartment and the anode compartment. Nafion ® is a polytetrafluoroethylene with fluorinated ether side chains terminated with sulfonic acid groups.

Anion membranes available from RAI, Inc. are preferred exemplary anion separators. They are permeable to anions while restricting the movement of cations. RAI membranes are made by radiation grafting quaternary ammonium compounds to polytetrafluorethylene.

The hydrogen-reactive anode 18 and the hydrogen-reactive cathode 20 are porous catalytic fuel cell electrodes. There are a wide range of fuel cell electrodes currently available for use in the thermally regenerated fuel cells of the present invention. Particularly suitable electrodes include porous platinum electrodes, porous palladium electrodes, and palladised silver-palladium electrodes. These are all easily constructed and support reasonably high current flows.

As shown in FIG. 1, the current collectors 22, 25 are connected to an external circuit 23 for generating an electrical current and voltage. The external circuit 23 can include electric motors or other systems for utilizing the electric energy generated by the fuel cell including storage systems, such as batteries. Optionally, storage of the systems fluid can be provided for the system of the present invention in order to allow the fuel cell to operate during periods when no heat input is available to the thermal regenerator. One such storage system is provided by using the regenerator 32 to store the anolyte. One storage system for the catholyte comprises a tank 39 inserted in line 36 to store regenerated catholyte.

The current collectors 22, 25 are typically fabricated from non-reactive conductive materials which freely allow the solvent-free anolyte 26 and solvent-free catholyte 24 to penetrate the hydrogen-reactive anode 18 and hydrogen-reactive cathode 20. Suitable materials are gold plated stainless steel screen, solid gold or platinum screen.

Solvent-free catholytes 24 which are suitable for use in the fuel cell cathode compartment 14 utilized in the present invention include at least one acid which is capable of supplying a proton to the hydrogen-reactive cathode 20 for reduction to hydrogen gas. Suitable solvent-free catholytes 24 are both gaseous acids and molten acids including HCl gas, molten mixtures of HCl and Lewis Acids, and oxonium salts of the type [(Et$_2$O)$_n$H]$^+$ MCl$_4^-$, where M is Al, Ga, In, or Fe and n is between 1 and 10.

Solvent-free anolytes 26 which are suitable for use in the fuel cell anode compartment 12 utilized in the present invention include at least one conductive molten base capable of combining with the anion of the catholyte 24 and the hydrogen ion generated by the oxidation of hydrogen gas at the hydrogen-reactive anode 18. Suitable solvent-free anolytes 26 are both gaseous bases and molten conductive bases including organic chloride bases such as substituted imidazolium chlorides, such as 1-methyl 3-ethyl imidazolium chloride (ImCl), substituted pyridinium chlorides, such as N-(1-butyl) pyridinium chloride, and various quaternary ammonium chlorides and bromides, as well as molten mixtures of the organic chloride base and its acid salt.

Also contemplated within the scope of the present invention are solvent-free anolytes 26 consisting of amines capable of being vaporized for use at a gas anode within a cell without decomposing at the cell operating temperature of between about 90° C. to 125° C.

In accordance with the present invention, either the solvent-free anolyte 26 or the solvent-free catholyte 24 or both the anolyte and catholyte comprise a room temperature molten conductive salt which is stable at the fuel cell operating temperature. A suitable solvent-free anolyte and solvent-free catholyte in which each is molten comprises an electrolyte system in which the anolyte is formed by combining $AlCl_3$ and $ImCl (Im^+Cl^-)$ to create an electrolyte containing the species $Im^+AlCl_4$ and $Im^+Cl^-$. Nearly all of the $AlCl_3$ reacts to form the ionic molten salt. The catholyte is formed by dissolving HCl in $ImHCl_2$ to form $ImHCl_2 \cdot HCl$. For one of the regeneration processes, it is also necessary to have $AlCl_3$ in the catholyte. In that case, the species present in the catholyte are $ImAlCl_4$ and $ImHCl_2 \cdot HCl$.

The purpose of adding $AlCl_3$ to the anolyte is to lower the melting point to approximately room temperature. By operating the cell at low temperature, it is possible to use $ImHCl_2$ as a reservoir for HCl on the cathode side without pressurization. HCl is the source of the hydrogen ion.

Another embodiment of the fuel cell in accordance with the present invention is operated at approximately 90° C. In this embodiment ImCl (liquid) is the anolyte and HCl gas is the catholyte, and $AlCl_3$ is not needed because a liquid reservoir for the catholyte is not utilized.

Additionally, the molten conductive salt must be capable of being thermally regenerated from its acid and base combination. The absence of an inert solvent obviates the need for fractional distillation equipment for regenerating the anolyte and catholyte which can be a significant energy drain. Furthermore, the molten nature of the conductive material enhances its conductivity and decreases the cell's internal resistance.

The operating temperature of the thermally regenerated fuel cell of the present invention, including the temperature of the solvent-free catholyte 24 and solvent-free anolyte 26, is preferably just high enough to maintain the anolyte or catholyte in a molten state. If heat input is required to maintain the molten state, the heat can be transferred from a source external to the electrochemical cell or the cell can be located within the environment of the heat source, or the cell can be operated at a power density sufficient to generate the required heat through normal operational energy losses.

In general, in order to regenerate the catholyte and anolyte consumed during operation of the electrochemical cell in accordance with the present invention, the reaction addition product is thermally decomposed. To accomplish this decomposition and regeneration, depending on the situation, the contents of either the cathode compartment or the anode compartment or both are removed from the cell and transferred to a common or separate regenerator.

For example, in order to regenerate the catholyte and anolyte consumed during operation of the electrochemical cell 10, the reaction addition product is thermally decomposed either continually or in a batch process. To accomplish this decomposition and regeneration, the contents of either the cathode compartment 14 or the anode compartment 12 or both are removed from the cell 10 and transferred to the thermal regenerator 32. If the product is formed in the anode compartment 12, the contents of that compartment is transferred to the thermal regenerator 32. If the salt is formed in both the anode compartment 12 and cathode compartment 14, both the anode and cathode compartment contents are transferred to the thermal regenerator 32.

The general operation of the thermally regenerated fuel cell of the present invention is described below in connection with its utility as a fuel cell using molten imidazolium chloride (ImCl) as a solvent-free anolyte and HCl gas as a solvent-free catholyte. As will be discussed below, the molten ImCl and HCl gas pair are a particularly suitable anolyte and catholyte combination for use in the practice of the present invention. In this embodiment, using gaseous HCl, $AlCl_3$ is not needed as set forth above.

The two half cell reactions for an electrochemical cell utilizing these electrolytes are the following:

Cathode: $2HCl + 2e^- \rightarrow H_2 + 2Cl^-$

Anode: $2ImCl + H_2 + 2Cl^- \rightarrow 2ImHCl_2 + 2e^-$

The above two reactions yield the net cell reaction $2ImCl + 2HCl \rightarrow 2ImHCl_2$ As can be seen from the cathode and anode reactions, HCl is consumed in the cathode compartment 14 with hydrogen gas and $Cl^-$ being generated at the hydrogen-reactive cathode 20. At the hydrogen-reactive anode 18, ImCl, $Cl^-$, and hydrogen gas are consumed with $ImHCl_2$ being generated. The electrochemical cell 10 is operated at a temperature which is at least high enough to maintain ImCl in its molten state which is approximately 90° C.

The embodiment of the present invention in which $AlCl_3$ is added to either or both anolyte and catholyte has exactly the same chemistry as set forth above. The $AlCl_3$ does not participate directly in the reaction, but does affect the cell voltage.

Hydrogen gas can be made available to the anode 18 in the anode compartment 12 by a number of different methods, including 1) externally passing the gas from the cathode compartment 14 to the anode compartment 12; 2) by permeation through the common ion conducting separator 16 which is also porous or nonporous; or 3) by saturating the anode 18 with hydrogen gas.

Hydrogen can permeate through either a porous ion conductor or an extremely thin supported nonporous ion conductor. For example, an asymmetric membrane such as those used in reverse osmosis is suitable. These membranes include a thick porous structure which is covered by a thin nonporous active layer.

In electrochemical cell designs in which a common anion conducting membrane is the common ion conducting separator 16, $Cl^-$ is made available in the anode compartment 12 via its permeation through the common ion conducting separator 16 from the cathode compartment 14 to the anode compartment 12. When the common ion conducting separator 16 is a common cation conducting membrane, Im+ travels from the anode compartment 12 to the cathode compartment 14 and forms $ImHCl_2$ in the cathode compartment 14. $Cl^-$ is made available for the formation of $ImHCl_2$ in the anode compartment 12 by the selected permeation of Im+ through the common cation conducting separator.

Current collectors 22, 25, such as gold plated stainless steel screen, described above, are attached to the anode 18 and cathode 20 for collecting the charge and carrying it to the external circuit for supplying or storing the generated electrical current.

The fuel cell of the present invention can be used for short term applications or for one time use where the fuel cell is discharged by the consumption of anolyte and/or catholyte. Such an application does not require the use of the thermal regenerator since the catholyte and anolyte are not intended to be continuously available. The preferred use, however, for the fuel cell of the present invention is in a system in which a continuous electrical current is generated and the anolyte and catholyte are directly regenerated thermally below about 250° C. and then recycled to the anode compartment and cathode compartment, respectively. The thermal regenerator is provided for thermally regenerating the catholyte and anolyte and subsequently replenishing the cathode compartment and the anode compartment.

The particular embodiment shown in FIG. 1 is illustrative of a system in which the solvent-free catholyte is a gaseous acid and the solvent-free anolyte is a molten base including the HCl gas catholyte and ImCl anolyte system described above. It is also primarily applicable to a system utilizing a porous common anion conducting separator. However, the general thermally regenerated fuel cell system of the present invention is equally applicable to a system in which the anolyte is a gaseous base and the catholyte is a molten acid, or both the anolyte and catholyte are molten.

As illustrated in FIG. 1, when the common ion conducting separator 16 is an anion conducting separator and the electrolytes are the HCl gas catholyte and molten ImCl anolyte pair described above, the ImCl is gradually converted to $ImHCl_2$ as the cell operates and $Cl^-$ and hydrogen gas migrate to the anode compartment 12 from the cathode compartment 14. In accordance with the present invention the ImCl and HCl regeneration procedure consists of transferring the $ImHCl_2$ from the anode compartment 12 through line 34 to the thermal regenerator 32. The $ImHCl_2$ is heated in the thermal regenerator 32 where it is thermally regenerated directly to HCl and ImCl. The heat required to maintain the temperature at a level sufficient to decompose the $ImHCl_2$ is supplied by an outside heat input, the possible sources of which are discussed below.

The regenerated HCl gas catholyte is then transferred from the thermal regenerator 32 through line 36 back to the cathode compartment 14. The regenerated molten ImCl anolyte is transferred from the thermal regenerator 32 through line 38 back to the anode compartment 12.

Figure 2:
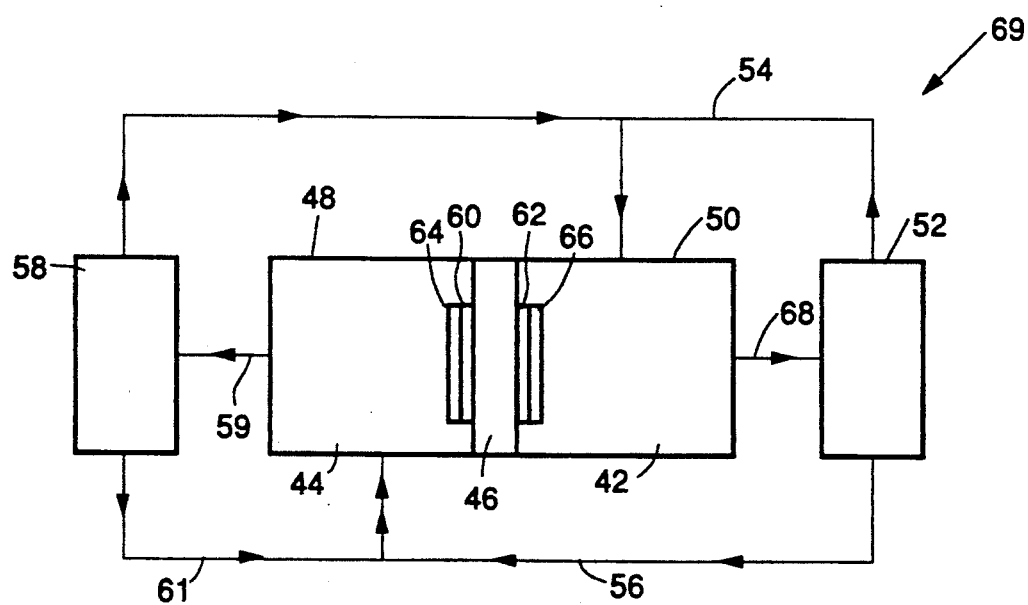
FIG. 2 is a schematic drawing of an exemplary electrochemical fuel cell of the present invention utilizing a common cation conducting separator.

FIG. 2 illustrates a thermally regenerated fuel cell 69 of the present invention which is applicable to the HCl catholyte 42 and ImCl anolyte 44 pair with a common cation conducting separator 46. During the cell operation, $ImHCl_2$ is not only formed in the anode compartment 48 as a result of Im+ leaving the anolyte, but $ImHCl_2$ is formed in the cathode compartment 50 as well. The thermally regenerated fuel cell detailed in FIG. 2 comprises all the components illustrated in FIG. 1 including an anode compartment 48, a cathode compartment 50, and a common cation separator 46 which separates the anode compartment 48 and cathode compartment 50. A porous hydrogen reactive anode 60 is located in the anode compartment 48 and a porous hydrogen reactive cathode 62 is located in the cathode compartment 50. Current collectors 64 and 66 are each in contact, respectively, with the hydrogen reactive anode 60 and hydrogen reactive cathode 62. Current collectors 64 and 66 are further each connectable to an external circuit (not shown) for carrying the generated electrical current. FIG. 2 additionally comprises a second thermal regenerator 52 for thermally converting the $ImHCl_2$ formed in the cathode compartment 50 directly to HCl gas and ImCl and a recycling conduit 54 for transferring HCl formed in the thermal regenerator 52 back to the cathode compartment 50. The thermally regenerated fuel cell 69 additionally, has a recycling conduit 56 for transferring the ImCl formed in the thermal regenerator 52 back to the anode compartment 48.

In actual operation, a thermally regenerated fuel cell in accordance with the present invention which utilizes a HCl gas and molten ImCl electrolyte system does not have an anolyte which is pure ImCl. Instead the anode compartment 48 contains a mixture of ImCl and $ImHCl_2$ because the regeneration procedure does not go to full completion. Consequently, when the anolyte is transferred back to the anode compartment 48 from either of the thermal regenerators 52, 58, it contains a mixture of ImCl and $ImHCl_2$.

Regeneration of the solvent-free anolyte and solvent-free catholyte for the case of a common cation separator shown in FIG. 2 is accomplished by transferring the catholyte from the cathode compartment 50 to thermal regenerator 52 through line 68. The catholyte is then partially regenerated in regenerator 52 so that both $ImHCl_2$ and ImCl coexist as a melt with a composition identical to the anolyte 44. The mixture is sent back to the anode compartment 48 through line 56 while HCl gas is returned to the cathode compartment 50 through line 54. The regeneration of anolyte 44 is performed in the same manner as described above with regard to FIG. 1, substituting line 59 for line 34, thermal regenerator 58 for thermal regenerator 32, and line 61 for line 38.

In another exemplary regeneration process for the ImCl/HCl system, the cell can be fully discharged. The concentration of $ImHCl_2$ is then the same in both anode and cathode compartments. The $ImHCl_2$ can then be transferred from the cathode compartment to the anode compartment. The solution in the anode compartment can be regenerated to ImCl. The HCl is sent back to the cathode. This regeneration process requires only one regenerator, but must be operated in a batch mode. $ImHCl_2$ can be transferred to the anode compartment from the cathode even before full discharge, but some inefficiency will develop. This is because HCl will dissolve in $ImHCl_2$ on the cathode side. If the cell is not fully discharged, dissolved HCl will be transferred from the cathode to the anode and react with the remaining ImCl to, in effect, chemically short the cell.

In one embodiment of the present invention, $AlCl_3$ is added to the anolyte to lower its melting point and thus the cell temperature. As set forth above, the lower cell temperature allows the use of $ImHCl_2$ as a reservoir for HCl without pressurization. With respect to the exemplary ImCl, $ImAlCl_4/ImHCl_2 \cdot HCl$ cells, if the membrane used is anionic, then regeneration is analogous to the ImCl/HCl system. Accordingly, the system is set up the same as shown in FIG. 1. The base is regenerated ImCl which is sent back to the base (anode) compartment and HCl is sent to the cathode. When the membrane used is cationic, there are three possible regeneration processes as follows:

1. The first process is analogous to that shown in FIG. 2 for ImCl/HCl, i.e. both electrolyte compartments are regenerated. As in the first system, some $ImHCl_2$ is allowed to build up in the anolyte because one hundred percent regeneration is not practical. On the cathode side, HCl is driven off in the regenerator and returned to the cathode. ImCl, with some $ImHCl_2$ mixed in, is transferred to the anode. Preferably, the cathode regeneration is set up such that the ratio of $ImHCl_2$ to ImCl in the material being transferred to the anode from the catholyte regenerator is the same as that found in the anolyte. On the anode side, $ImHCl_2$ is also regenerated. The HCl driven off is returned to the cathode. The $AlCl_3$ does not participate in the regeneration process except indirectly by altering the activities of the other components of the electrolyte.

2. In a second alternative process, only one regenerator is used. The cell is fully discharged before regeneration. Unlike the ImCl/HCl system, some but not all of the electrolyte is transferred from the cathode to the anode compartment. Only part of the electrolyte is transferred because the cathode requires some $ImHCl_2$ in which to dissolve HCl. The electrolyte of the anode compartment is regenerated. The HCl is sent to the cathode compartment. The remaining material consisting of mostly ImCl with some $ImHCl_2$ is retained and sent to the anode compartment. As before, incomplete cell discharge leads to "chemical shorting". Also, $AlCl_3$ does not participate in the reaction 3. The third process involves making the electrolyte in either compartment alternately basic and acidic. It also requires one regenerator. For this process to work, there must be equal amounts of $ImAlCl_4$ used in both acid and base compartments. First, the cell must be fully discharged for maximum efficiency, although partial discharge is possible. The spent acid at the cathode and the spent base at the anode both contain $ImHCl_2$ and $ImAlCl_4$, though not necessarily in the same proportions. The spent acid is regenerated, but the HCl driven off is sent to the anode compartment. The remaining material is sent back into the acid compartment. This provides conversion of the acid electrolyte into base electrolyte and vice versa. No solution is transferred, only gas.

During the next cycle, the regenerator has to be connected to the new acid compartment. If the cell is not fully discharged, the regeneration process will send HCl to a less than fully discharged base and a chemical reaction will result. Again, the result will be chemical shorting and loss of efficiency.

As mentioned above, ImCl is particularly well suited for use in the thermally regenerated fuel cells of the present invention. It is a highly conductive organic base chloride. It is also molten at approximately 85° C. which makes it suitable for use in electrochemical cells with an operating temperature of at least 85° C. The molten state and high conductivity of the ImCl contribute to an electrochemical cell with enhanced efficiency. There is no requirement to provide an inert solvent for the $ImHCl_2$ and the high conductivity of ImCl reduces the internal resistance which leads to a cell with a high power output.

An additional advantage to the use of an ImCl anolyte is in connection with its use with a HCl gas catholyte. The regeneration of sufficient amounts of ImCl and HCl from the $ImHCl_2$ reaction product is easily accomplished with heat at a temperature of approximately 180° C. Since there are no inert solvents present there is no need for fractional distillation equipment to accomplish the regeneration. This is particularly important because fractional distillation techniques are energy drains and the distillation columns occupy valuable space.

The design of the thermally regenerated fuel cell of the present invention also contributes to its efficiency. When aqueous electrolyte systems are utilized in fuel cells, the low electrolyte surface tension allows the electrolyte to flood the pores of porous common ion conducting separator. Consequently, conventional aqueous systems utilize non-porous separators and require external plumbing to transfer the hydrogen gas. The solvent-free catholyte and solvent-free anolyte utilized in the fuel cells of the present invention make it possible to use porous common ion conducting separators. Such porous separators allow the free passage of hydrogen gas between the cathode compartment and anode compartment and obviate the requirement for external plumbing which is frequently a source of leaks.

The heat input required for both the operation of the electrochemical cell and the regeneration of the anolyte and catholyte can be provided by a number of different heat sources. It is desirable that the heat input be provided from the waste heat of a system external to the electrochemical cell such as internal combustion engines or oil well heads. Additional sources include geothermal heat, solar collectors, and low grade waste heat generated in various industrial processes.

The following example describes the operation of a thermally regenerated fuel cell of the present invention. The example also illustrates methods for regenerating the electrochemical cell reactants and presents test data for a molten $ImCl/ImHCl_2$ anolyte and HCl gas catholyte system.

EXAMPLE 1

A fuel cell system having the same general structure as shown in FIG. 1 was constructed in the following manner. Substantially pure $ImHCl_2$ was prepared by flowing HCl gas at atmospheric pressure through approximately 9 grams of ImCl chilled in an acetone-dry ice bath for one hour. The resulting mixture was placed under vacuum for about 16 hours to remove excess HCl and provide $ImHCl_2$.

A mixture consisting of 9:1 ImCl to $ImHCl_2$, representing the anolyte content in a continuously regenerated electrolyte, was prepared by mixing 5 grams of ImCl and 0.794 grams of $ImHCl_2$.

The melt mixture of $ImHCl_2$ and ImCl was then placed in the anode compartment. The anode was a perforated palladised silver-palladium disk which was previously charged with hydrogen. By precharging the anode, hydrogen is conveniently supplied to the palladised silver-palladium electrode and the electrochemical cell can be utilized for short term testing without requiring an external hydrogen source or the use of a porous separator. The anode was pushed against a piece of 5 mil (0.013 cm) thick Nafion ® membrane (available from Dupont) which is a nonporous cation conducting membrane. The current collector for the palladium electrode was a gold plated stainless steel screen backed by a perforated gold plated stainless steel disk. The disk applies pressure to the screen while still allowing electrolyte to penetrate to the electrode.

In the cathode compartment, a Prototech III fuel cell electrode obtained from Prototech now E-TEK Inc. of Framingham, Mass., was bonded to the Nafion ® membrane common ion separator by hot pressing procedures. A gold plated stainless steel screen was put in place as a current collector and HCl gas was allowed to flow radially through the screen to supply the cathode.

The cell was heated to between 100° C. and 110° C. and a peak open circuit voltage (OCV) of 760 mV was measured. A short circuit current of 2.2 ma/cm$^2$ was also measured.

EXAMPLE 2

This example presents data on the regeneration of the cell reactants. Since only small amounts of reaction products were formed in the experimental cell described in Example 1, the regeneration tests were performed on mixtures of ImCl and ImHCl$_2$ which were created to simulate anolytes at different states of discharge. Portions of these mixtures were heated at various temperatures to thermally regenerate the ImCl. The first portion of the simulated molten anolyte contained 79.5 mole percent ImHCl$_2$ which represents the anolyte in a electrochemical cell which is 79.5% discharged. A second portion of simulated molten anolyte contained 50 mole percent ImHCl$_2$ which represents the anolyte in a electrochemical cell which is 50% discharged. The remainder of the molten material was ImCl. The portions were heated in an evacuated thermal regeneration system and the pressure and the temperature were measured. It was determined that HCl is released and the release is increased as the temperature increases. The test results further suggested that at between 190° C. and 200° C. the ImCl decomposes. The data in this temperature range is not linear with the additional data indicating that other reactions are taking place in the regenerator. As expected, a calculation of $\Delta H$ of regeneration shows that at 50 mole percent ImHCl$_2$, the $\Delta H$ is higher than at 79.5 mole percent ImHCl$_2$.

EXAMPLE 3

In another example, a cell was built and tested using ImCl as an anolyte and HCl as a catholyte but using an anionic non-porous membrane. Two E-TEK porous electrodes (made by E-TEK Inc. formerly Prototech) were hot pressed to RAIPORE R1030 non-porous anionic membrane made by RAI Inc.. Hydrogen was provided to the anode from an external source for simplicity rather than recycled from the cathode. Hydrogen was conducted to the anode by a piece of wetproofed carbon cloth pressed up against the anode. The edge of the cloth was exposed to the hydrogen. The anolyte was pure ImCl and the catholyte was HCl gas. Current collectors were gold plated stainless steel screen. The cell was operated at 110 degrees C. Output was 10.9 ma/cm$^2$ at 0 volts. Open circuit voltage was 300 mv, and maximum power density was 0.69 mw/cm$^2$.

Having thus described preferred embodiments of the present invention, it should be noted by those skilled in the art that the disclosures herein are exemplary only and alternatives, adaptations and modifications may be used within the scope of the present invention.

What is claimed is:

1. A thermally regenerated fuel cell for generating an electric current, said fuel cell comprising:
   an electrochemical cell having an anode compartment and a cathode compartment, said cathode compartment and said anode compartment separated by a common ion conducting separator;
   a porous hydrogen-reactive anode located in said anode compartment and a porous hydrogen-reactive cathode located in said cathode compartment;
   a first current collector and a second current collector each having a first and second surface wherein each of said first surface of said first and second current collectors contacts, respectively, said anode and said cathode,
   a solvent-free catholyte selected from the group consisting of gaseous acids and molten conductive acids, said catholyte located in contact with said cathode and in said cathode compartment wherein hydrogen gas is generated and said catholyte is consumed during generation of said electrical current;
   a solvent-free anoyte selected from the group consisting of gaseous bases and conductive molten bases, said anolyte located in contact with said anode and in said anode compartment wherein said base and said hydrogen are consumed at said anode during generation of said electrical current and said base and said acid combine to form a salt which can be thermally decomposed to form said acid and said base; and
   thermal regenerator means for thermally converting said salt back to said acid and said base to replenish said acid consumed during generation of said electrical current.

2. A thermally regenerated fuel cell according to claim 1 wherein said common ion conducting separator is a non-porous membrane and further including means for transferring said hydrogen gas generated at said cathode to said anode compartment for consumption at said anode during generation of said electric current.

3. A thermally regenerated fuel cell according to claim 1 wherein said solvent-free anolyte is a molten conductive base selected from the group consisting of substituted imidazolium chlorides, substituted pyridinium chlorides, quaternary ammonium chlorides and bromides, and mixtures thereof with and without AlCl$_3$.

4. A thermally regenerated fuel cell according to claim 1 wherein said solvent-free catholyte is a gaseous acid consisting essentially of HCl.

5. A thermally regenerated fuel cell according to claim 1 wherein said solvent-free catholyte is selected from the group consisting of: (a) a mixture comprising ImHCl$_2$·HCl; (b) a mixture comprising ImAlCl$_4$ and ImHCl$_2$ HCl; and (c) the gaseous acid HCl.

6. A thermally regenerated fuel cell according to claim 5 wherein said solvent-free anolyte is a molten mixture of ImCl, ImAlCl$_4$ and ImHCl$_2$.

7. A thermally regenerated fuel cell according to claim 1 wherein said solvent-free catholyte is a molten conductive acid of the general formula [(Et$_2$O)nH]$^+$MCl$_4^-$ wherein M is selected from the group of inorganic ions consisting of Al, Ga, In, and Fe and wherein n is between 1 and 10.

8. A thermally regenerated fuel cell according to claim 1 wherein said anolyte is a gaseous base selected from the group consisting of diethylamine, dimethylamine and dipropylamine.

9. A thermally regenerated fuel cell according to claim 1 wherein said common ion conducting separator is an asymmetric separator comprising a porous layer and a non-porous ion-conducting membrane attached thereto.

10. A thermally regenerated fuel cell according to claim 1 wherein said common ion separator is porous and further including means for transferring hydrogen gas formed in said cathode compartment to said anode compartment for consumption at said anode during generation of said electrical current.

11. A thermally regenerated fuel cell according to claim 1 wherein said common ion conducting separator is an anion conducting membrane.

12. A thermally regenerated fuel cell for generating an electrical current said fuel cell comprising:
   an electrochemical cell having an anode compartment and a cathode compartment, said cathode compartment and said anode compartment separated by a common ion conducting separator;
   a porous hydrogen-reactive anode located in said anode compartment and a porous hydrogen-reactive cathode located in said cathode compartment;
   a first current collector and a second current collector each having a first and second surface wherein each of said first surface of said first and second current collectors contacts, respectively, said anode and said cathode, and each of said second surface of said first and second current collectors contacts respectively said anode compartment and said cathode compartment;
   a catholyte comprising gaseous HCl located in contact with said cathode and in said cathode compartment wherein said hydrogen gas is generated and gaseous HCl is consumed during said electrical current generation;
   a molten anolyte comprising a mixture of ImCl and ImHCl$_2$ located in contact with said anode and in said anode compartment wherein ImCl and hydrogen are consumed and wherein ImHCl$_2$ is formed at said anode during generation of said electrical current;
   thermal regenerator means for thermally converting ImHCl$_2$ directly to HCl and a mixture of ImCl and ImHCl$_2$;
   means for transferring ImHCl$_2$ from said anode compartment to said thermal regenerator;
   anode recycle means for transferring said mixture of ImCl and ImHCl$_2$ formed in said thermal regenerator back to said anode compartment to replenish ImCl consumed during generation of said electrical current;
   cathode recycle means for transferring HCl formed in said thermal regenerator back to said cathode compartment to replenish said HCl consumed during generation of said electrical current.

13. A method for generating an electrical current comprising the steps of:
   contacting a porous hydrogen-reactive cathode with a solvent-free catholyte selected from the group consisting of gaseous acids and molten conductive acids, said porous hydrogen-reactive cathode and solvent-free catholyte being located in a cathode compartment, said cathode compartment having a common ion conducting separator in common with an anode compartment, and wherein hydrogen gas is generated and said solvent-free catholyte is consumed;
   contacting a porous hydrogen-reactive anode with a solvent-free anolyte selected from the group consisting of molten conductive bases and gaseous bases, said porous hydrogen-reactive anode and solvent-free anolyte being located in said anode compartment, wherein said solvent-free base, an anion of said solvent-free acid, and hydrogen gas are consumed and a salt of said base and said acid is formed during generation of said electrical current;
   introducing hydrogen gas into said anode compartment;
   collecting said electrical current on a first current collector and a second current collector, said first and second current collectors each having a first and second surface wherein each of said first surface contacts, respectively, said anode and said cathode, and each of said second surface of said current collectors contacts respectively said anode compartment and said cathode compartment;
   thermally converting said salt to said solvent-free base and said solvent-free acid to replenish the catholyte and anolyte consumed during generation of said electrical current.

14. The method according to claim 13 wherein said solvent-free anolyte is a molten conductive base selected from the group consisting of substituted imidazolium chlorides, substituted pyridinium chlorides, quaternary ammonium chlorides and bromides, and mixtures thereof with and without AlCl$_3$.

15. The method according to claim 13 wherein said solvent-free catholyte is a gaseous acid consisting essentially of HCl gas.

16. The method according to claim 13 wherein said solvent-free catholyte is a mixture of molten salt and gaseous acid consisting of: (a) ImAlCl$_4$, ImHCl$_2$, and HCl, or (b) ImHCl$_2$, and HCl.

17. The method according to claim 13 wherein said solvent free anolyte is a molten mixture of ImCl, ImAlCl$_4$ and ImHCl$_2$.

18. The method according to claim 13 wherein said solvent-free catholyte is a molten conductive acid of the general formula $[(Et_2O)_nH]^+MCl_4^-$, wherein M is selected from the group of inorganic ions consisting of Al, Ga, In, and Fe and n is between 1 and 10.

19. The method according to claim 13 wherein anolyte is a gaseous base selected from the group consisting of diethylamine, dimethylamine, and dipropylamine.

20. The method according to claim 13 wherein said common ion conducting separator is an anion conducting membrane.

21. The method according to claim 13 wherein said common ion conducting separator is a cation conducting membrane.

22. A thermally regenerated fuel cell according to claim 1 wherein said solvent-free anolyte is an amine which is capable of being vaporized without decomposing at a temperature of between about 90° C. to 125° C.

23. A thermally regenerated fuel cell according to claim 1 further comprising first storage means connected to said anode compartment for storing said anolyte and second storage means connected to said cathode compartment for storing said catholyte.

* * * * *